US009158601B2

(12) United States Patent
Zhang et al.

(10) Patent No.: US 9,158,601 B2
(45) Date of Patent: Oct. 13, 2015

(54) MULTITHREADED EVENT HANDLING USING PARTITIONED EVENT DE-MULTIPLEXERS

(71) Applicant: VMware, Inc., Palo Alto, CA (US)

(72) Inventors: Kai Zhang, Sunnyvale, CA (US); Joy Ghosh, Fremont, CA (US); Clinton Wong, Pacifica, CA (US)

(73) Assignee: VMware, Inc., Palo Alto, CA (US)

( * ) Notice: Subject to any disclaimer, the term of this patent is extended or adjusted under 35 U.S.C. 154(b) by 70 days.

(21) Appl. No.: 13/892,075

(22) Filed: May 10, 2013

(65) Prior Publication Data

US 2014/0337864 A1     Nov. 13, 2014

(51) Int. Cl.
  *G06F 3/00*     (2006.01)
  *G06F 9/44*     (2006.01)
  *G06F 9/46*     (2006.01)
  *G06F 13/00*    (2006.01)
  *G06F 9/54*     (2006.01)

(52) U.S. Cl.
  CPC ...................................... *G06F 9/542* (2013.01)

(58) Field of Classification Search
  CPC ........................................................ G06F 9/542
  USPC ............................................................ 719/318
  See application file for complete search history.

(56) References Cited

U.S. PATENT DOCUMENTS

| 6,223,207 | B1 * | 4/2001 | Lucovsky et al. ............. 718/107 |
| 2002/0156897 | A1 * | 10/2002 | Chintalapati et al. ......... 709/227 |
| 2007/0006232 | A1 * | 1/2007 | Bliss ............................. 718/100 |
| 2011/0099550 | A1 * | 4/2011 | Shafi ............................. 718/102 |
| 2012/0117075 | A1 * | 5/2012 | Gokulakannan ............... 707/741 |

OTHER PUBLICATIONS

G. Banga and J. C. Mogul, "Scalable kernel performance for Internet servers under realistic loads", Proceedings of the USENIX Annual Technical Conference (No. 98), Louisana, NO, Jun. 1998.
G. Banga, J. C. Mogul, and P. Druschel, "A scalable and explicit event delivery mechanism for unix", Proceedings of the Usenix Annual Technical Conference, Monterey, CA, Jun. 6-11, 1999.
M. P. I. Forum, "MPI: A message-passing interface standard", International Journal of Supercomputer Applications, 8 (3/4):165-414, May 5, 1994.
I. Pyarali, T. Harrison, D. C. Schmidt, and T. Jordan, "Proactor an object behavioral pattern for dispatching asynchronous event handlers", In Proceedings of the 4th Pattern Languages of Programming Conference, Sep. 1997.
K. Hickman, "The SSL Protocol", Internet Draft, Netscape Communications Corp., draft-hickmansetscape-ssl-01.txt, Apr. 1995.
D. Kegel, "The C10K problem," available at http://www.kegel.com/c10k.html, Jul. 21, 2011.

(Continued)

*Primary Examiner* — Andy Ho
*Assistant Examiner* — Timothy A Mudrick (57) ABSTRACT

Techniques for handling events are provided. In one embodiment, a computer system can create a plurality of I/O handles for receiving events. The computer system can further partition the plurality of I/O handles into one or more subsets, where events received via I/O handles in the same subset are correlated and events received via I/O handles in different subsets are uncorrelated. The computer system can then delegate each I/O handle in the plurality of I/O handles to a poll thread in a plurality of poll threads, where I/O handles in the same subset are delegated to the same poll thread.

30 Claims, 9 Drawing Sheets

(56) References Cited

OTHER PUBLICATIONS

O. Dragoi, "The Conceptual Architecture of the Apache Web Server", Univeristy of Waterloo, Jan. 26, 1999, available online at http://www.shoshin.uwaterloo.ca/~oadragoi/cw/CS746G/a1/apache_conceptual_arch.html.

A. Alexeev, "The Architecture of Open source Applications—vol. II: Structure, Scale, and a Few More Fearless Hacks", available at http://www.aosabook.org/en/nginx.html, viewed May 9, 2013.

* cited by examiner

MULTITHREADED EVENT HANDLING USING PARTITIONED EVENT DE-MULTIPLEXERS

BACKGROUND

Many types of server applications and system-level services operate according to an event-driven paradigm; in other words, they monitor for events from one or more event sources and then process the events using event handling logic. In recent years, there has been an increasing need to scale the performance of such applications/services in order to handle very large numbers of concurrent events. This need, along with the proliferation of multiprocessor computer systems, has led many developers to implement multithreading for parallelizing event processing across multiple threads/processors.

One common approach for implementing multithreading in an event-driven application involves reserving a single thread as a poll thread and a pool of threads as worker threads. The poll thread monitors for incoming events on all of the active connections between the application and event sources, where each active connection is represented by an I/O handle (e.g., a network socket, a file descriptor, etc.). The set of monitored I/O handles comprise the poll thread's poll list. The poll thread typically implements this monitoring functionality using an event de-multiplexer, such as the select( ) or poll( ) system call available in UNIX. When the poll thread detects an event via the event de-multiplexer, the poll thread reads the event from its corresponding I/O handle and schedules a task to be performed for the event in a task queue. One of the worker threads thereafter picks up the task from the task queue and processes the task using an appropriate event handler.

While the foregoing approach is functional, it also suffers from a number of inefficiencies and disadvantages. First, traditional event de-multiplexers (e.g., the UNIX select( ) and poll( ) system calls) generally do not scale well with the number of concurrent I/O handles being monitored. Thus, if the size of the poll thread's poll list grows to be very long, the poll thread can become a bottleneck for overall application throughput and performance. Second, multiple worker threads may require access to the same resource (e.g., file, database table, etc.) simultaneously. This may occur if, for example, back-to-back tasks in the task queue require invocation of the same event handler. To account for this, the application developer must write synchronization code in order to avoid resource deadlocks and race conditions between worker threads, which significantly complicates application design and testing. Third, threads tend to block on synchronization primitives. This means that, in order to avoid running out of free worker threads (which are synchronized as mentioned above), the worker thread pool size must be fairly large. This, in turn, can lead to reduced performance due to context switching, cache thrashing, and other problems that occur when a large number of threads are constantly loaded and unloaded on a smaller number of processors.

SUMMARY

Techniques for handling events are provided. In one embodiment, a computer system can create a plurality of I/O handles for receiving events. The computer system can further partition the plurality of I/O handles into one or more subsets, where events received via I/O handles in the same subset are correlated and events received via I/O handles in different subsets are uncorrelated. The computer system can then delegate each I/O handle in the plurality of I/O handles to a poll thread in a plurality of poll threads, where I/O handles in the same subset are delegated to the same poll thread.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes an improved framework for performing multithreaded event handling. In one embodiment, an event-driven application running on a computer system can create a plurality of poll threads, where the number of poll threads is related to the number of available processors in the computer system. For instance, the event-driven application can create one poll thread per available processor, two poll threads per available processor, or the like. Each poll thread can execute its own instance of an event de-multiplexer.

When the event-driven application receives a connection request from an event source, the event-driven application can create an I/O handle for the connection and classify the I/O handle according to one or more preconfigured rules. This classification can identify the I/O handle as being part of a particular subset of the total set of I/O handles created by the event-driven application, such that (1) events received via I/O handles in the same subset are correlated from a synchronization perspective (and thus would likely require synchronization if processed concurrently by different threads) and (2) events received via I/O handles in different subsets are uncorrelated from a synchronization perspective (and thus would not require, or require less, synchronization).

Upon classifying the I/O handle, the event-driven application can delegate the I/O handle to a selected poll thread in the plurality of poll threads. The event-driven application can perform this step in a manner that causes all of the I/O handles in the same subset to be delegated to the same poll thread. For example, the event-driven application can delegate all I/O handles in subset A to a first poll thread T1, all I/O handles in subset B to a second poll thread T2, and so on. The selected poll thread can then monitor for events received via the I/O handle using the poll thread's event de-multiplexer and process the events using one or more event handlers.

With the framework above, many of the issues associated with existing multithreaded event handling approaches can be mitigated or avoided. For instance, since the event-driven application delegates I/O handles to poll threads based on subset membership (which is, in turn, based on the degree of correlation between I/O handles/events), the event handling performed by each poll thread can be largely independent from the event handling performed by other poll threads. This minimizes, or in some cases eliminates, the need for application-level synchronization between threads.

Further, because I/O handles are partitioned across multiple poll threads (rather than being monitored by a single poll thread), the poll list of each poll thread can be kept relatively short. This prevents performance bottlenecks that may arise due to overloading a single event de-multiplexer/poll thread with a very long poll list.

Yet further, since the number of poll threads that the event-driven application creates is tied to the number of available processors in the host computer system, the application can scale in performance as additional processors are added or made available. This tight coupling between poll thread count and available processor count also allows for higher per-processor utilization while reducing the amount of performance loss/overhead incurred due to cache thrashing and context switching.

Figure 1:
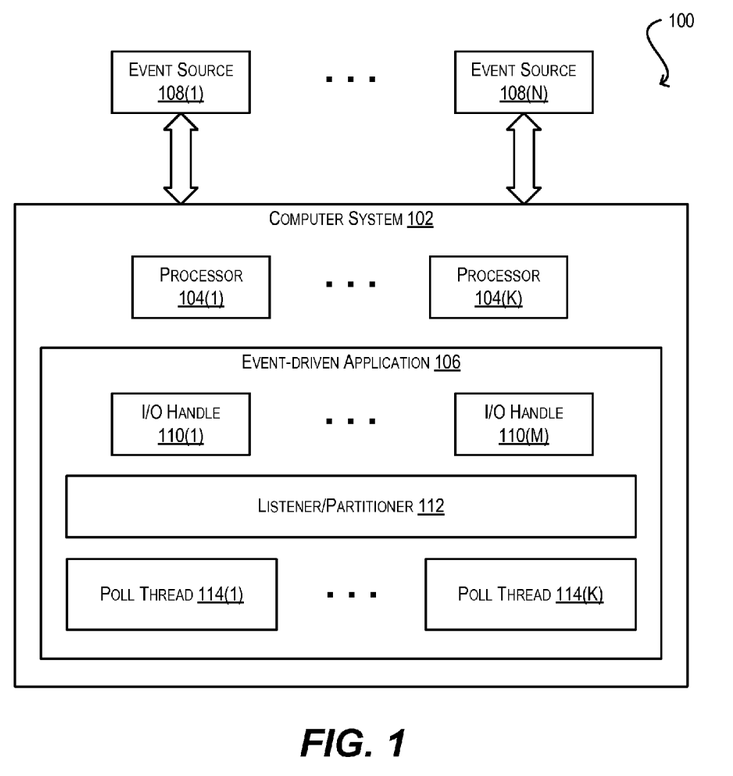
FIG. 1 depicts a system environment according to an embodiment.

FIG. 1 depicts a system environment 100 that supports multithreaded event handling according to an embodiment. As shown, system environment 100 includes a computer system 102 that comprises a plurality of processors 104(1)-104(K) and an event-driven application 106. Each processor 104(1)-104(K) can be a physical processing unit (e.g., a physical CPU or a physical core within a multi-core CPU) or a virtual processing unit (e.g., a virtual CPU in a virtual machine). Event-driven application 106 can be any type of software that monitors for and processes events, such as a web server, a database server, a system-level event handling service, or the like.

In operation, event-driven application 106 can receive connection requests from one or more event sources 108(1)-108(N). In the embodiment of FIG. 1, event sources 108(1)-108(N) are depicted as entities that are external to computer system 102, such as client devices that communicate with computer system 102 over a network. In alternative embodiments, one or more of event sources 108(1)-108(N) may be internal to computer system 102, such as a software application or resource available on system 102.

In response to receiving the connection requests, event-driven application 106 can create a plurality of I/O handles 110(1)-110(M) (e.g., one I/O handle per connection request). Each I/O handle 110(1)-110(M) can represent an interface (e.g., a network socket, file descriptor, etc.) for receiving data from, and transmitting data to, a connected event source 108(1)-108(N). Event-driven application 106 can thereafter monitor I/O handles 110(1)-110(M) for incoming events from the connected event sources and process the events using one or more event handlers (not shown).

As noted in the Background section, many existing event-driven applications implement multithreading to take advantage of multiple processors, but rely on a "single poll thread/multiple worker threads" approach that suffers from various limitations (e.g., poll thread bottlenecking, need for complex synchronization between worker threads, excessive context switching/cache thrashing due to large thread pool size, etc.).

To address these and other similar issues, event-driven application 106 can implement a multithreaded framework that employs a listener/partitioner 112 and multiple poll threads 114(1)-114(K). As described in further detail below, listener/partitioner 112 and poll threads 114(1)-114(K) can interoperate in a manner that enables event-driven application 106 to scale in throughput/performance as the number of processors 104(1)-104(K) grows, without incurring the costs and inefficiencies of prior art multithreaded approaches.

Figure 2:
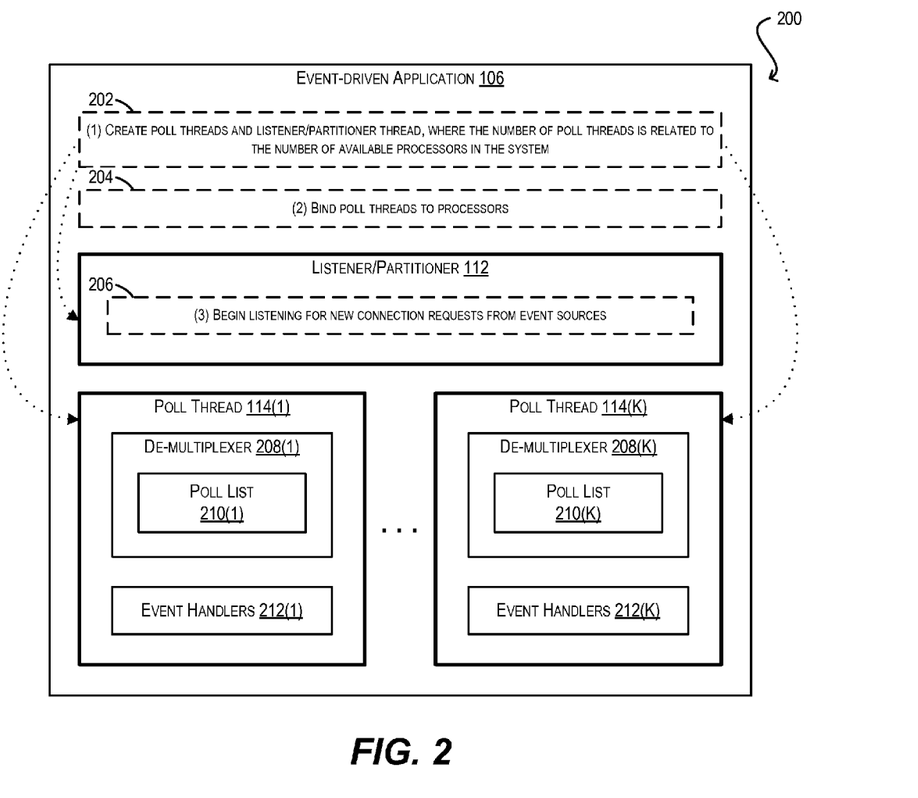
FIG. 2 depicts a flow for initializing an event-driven application according to an embodiment.

FIG. 2 depicts a flow 200 that can be performed by event-driven application 106 of FIG. 1 for initializing listener/partitioner 112 and poll threads 114(1)-114(K) according to an embodiment. In one embodiment, event-driven application 106 can perform flow 200 upon application startup.

At step (1) of flow 200 (reference numeral 202), event-driven application 106 can create poll threads 114(1)-114(K) (and optionally, listener/partitioner 112) as distinct threads within the process space of application 106. In cases where listener/partitioner 112 is not assigned its own thread, the functionality of listener/partitioner 112 can be subsumed by a designated poll thread. Each poll thread 114(1)-114(K) can execute an instance of an event de-multiplexer 208(1)-208(K), which is an OS-level function that waits for events to arrive on a set of I/O handles and signals its caller when one or more events are received. The set of I/O handles monitored by each event de-multiplexer is referred to as a poll list (210(1)-210(K)). Examples of well-known event de-multiplexers include the select( ) and poll( ) functions in UNIX and the WaitForMultipleObjects( ) function in Windows.

Each poll thread 114(1)-114(K) can also include one or more event handlers 212(1)-212(K) that allow the poll thread to process events that are detected via its respective event de-multiplexer. Thus, unlike the "single poll thread/multiple worker threads" approach where the single poll thread is solely responsible for monitoring for events, poll threads 114(1)-114(K) of FIG. 1 can both monitor for and process events. The event processing flow(s) that can be carried out by poll threads 114(1)-114(K) are described with respect to FIGS. 4, 5, and 7 below.

As part of the thread creation process of step (1), event-driven application 106 can limit the number of poll threads that are created based on the number of available processors in computer system 106. For instance, in FIGS. 1 and 2, there is a 1:1 ratio of poll threads to processors (K poll threads to K processors). In other embodiments, there may be a moderately greater or fewer number of poll threads to processors (e.g., 0.5:1, 1.5:1, 2:1, etc.). This relatively tight coupling between poll thread count and available processor count reduces the likelihood that poll threads 114(1)-114(K) will need to be loaded and unloaded from processors 104(1)-104(K) on a frequent basis, and thus minimizes the performance loss associated with context switching and cache thrashing at the processor level.

At step (2) (reference numeral 204), event-driven application 106 can bind each poll thread 114(1)-114(K) to a particular processor 104(1)-104(K), such that the poll threads are relatively evenly distributed across the processors. For example, event-driven application 204 can bind each poll thread 114(1)-114(K) to a separate processor. In some embodiments, this binding can be performed at the OS (rather than application) level by, e.g., an OS thread scheduler, in which case step (2) may be omitted from flow 200.

Finally, at step (3) (reference numeral 206), listener/partitioner 112 can begin listening for new connection requests from one or more event sources (e.g., event sources 108(1)-108(N) of FIG. 1).

Figure 3:
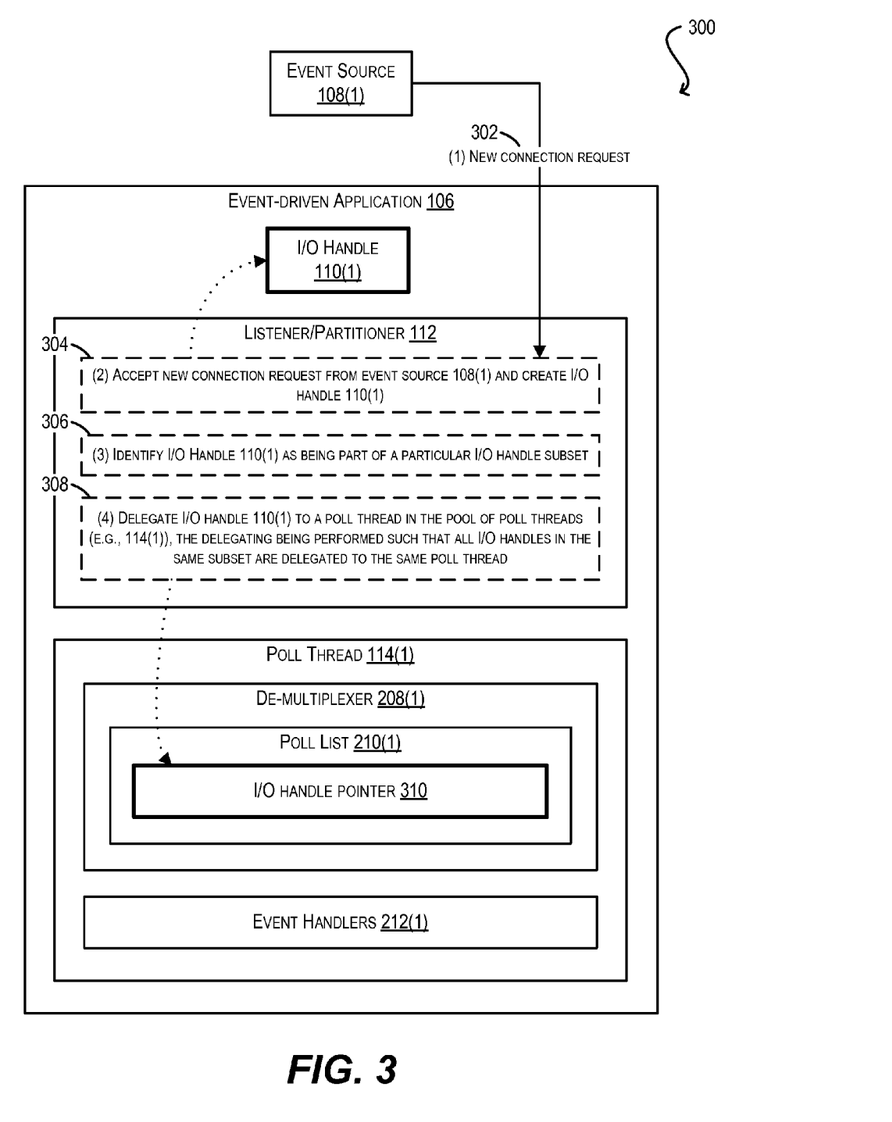
FIG. 3 depicts a flow for processing new connection requests from event sources according to an embodiment.

FIG. 3 depicts a flow 300 that can be performed by listener/partitioner 112 (after flow 200 of FIG. 2) for processing new connection requests from event sources 108(1)-108(N) according to an embodiment. At step (1) of flow 300 (reference numeral 302), listener/partitioner 112 can receive a new connection request from, e.g., event source 108(1). In response, listener/partitioner 112 can accept the connection request and create a corresponding I/O handle 110(1) (step (2), reference numeral 304). As noted previously, I/O handle 110(1) is an interface, such as a network socket or a file descriptor, that allows event-driven application 106 to receive and transmit data to/from event source 108(1).

At step (3) (reference numeral 306), listener/partitioner 112 can identify newly created I/O handle 110(1) as being part of a particular subset of the total set of I/O handles created by event-driven application 106. For example, I/O handles 110(1)-110(M) may be divided into subsets A, B, and C, and I/O handle 110(1) may be identified as being part of subset A. Generally speaking, the subsets can be defined such that events received via I/O handles in the same subset are correlated from a synchronization perspective (and thus would likely require synchronization if handled concurrently by different threads), whereas events received via I/O handles in different subsets are uncorrelated from a synchronization perspective (and thus would not require, or require less, synchronization). As a result, these subsets can essentially reflect the degree of independence (or interdependence) between I/O handles/events.

In certain embodiments, the specific subset definitions that listener/partitioner 112 uses to drive the identification at step (3) may be preconfigured (e.g., defined by a human or automated agent), and may vary depending on the nature of event-driven application 106. This is because different types of applications may require different subset definitions in order to successfully group together correlated I/O handles/events. For example, consider a scenario where event-driven application 106 is a web service that serves HTTP sessions for different users. In this scenario, events generated or consumed by the same user of the web service will likely be correlated. On the other hand, events generated or consumed by different users will likely be loosely correlated, or may not be correlated at all. Thus, for this type of application, the I/O handle subsets may be defined on a user basis, such that I/O handles pertaining to the same user are considered part of the same subset.

As another example, consider a scenario where event-driven application 106 is a resource controller than manages access to a number of different physical or virtual resources. In this scenario, events (e.g., reads or writes) destined for the same resource will be highly correlated, whereas events destined for different resources will be largely uncorrelated. Thus, for this type of application, the I/O handle subsets may be defined on a resource basis, such that I/O handles pertaining to the same resource are considered part of the same subset.

Once I/O handle 110(1) has been identified as being part of a subset per step (3), listener/partitioner 112 can delegate I/O handle 110(1) to a selected poll thread (e.g., 114(1)) in the pool of poll threads 114(1)-114(K) (step (4), reference numeral 308). As part of this step, listener/partitioner 112 can send a message to selected poll thread 114(1) that causes the poll thread's event de-multiplexer 208(1) to register I/O handle 110(1), resulting in the creation of a pointer to I/O handle 110(1) (i.e., I/O handle pointer 310) in the event de-multiplexer's poll list 210(1).

Significantly, listener/partitioner 112 can perform the delegation of step (4) in manner that causes all I/O handles in the same subset to be delegated to the same poll thread. Thus, in the example of FIG. 3, listener/partitioner 112 has essentially selected poll thread 114(1) as the "dedicated" poll thread for all I/O handles in the same subset of I/O handle 110(1); any future I/O handles in this subset will be delegated to poll thread 114(1). Since I/O handles across different subsets are uncorrelated from a synchronization perspective, this mapping of I/O handle subsets to specific poll threads can minimize, or eliminate, the need for synchronization across poll threads. In some embodiments, listener/partitioner 112 may map a single I/O handle subset to a single poll thread. In other embodiments, in order to keep the total number of poll threads low, listener/partitioner 112 may map multiple I/O handle subsets to one poll thread.

After step (4), flow 300 can return to step (1) so that listener/partitioner 112 can process additional connection requests as they arrive. The effect of this repeated process is that newly created I/O handles will be partitioned across event de-multiplexers 208(1)-208(K) of poll threads 114(1)-114(K) in a non-overlapping manner (per the subset rules described above). Upon being delegated an I/O handle, each poll thread can perform the dual functions of monitoring for and processing events received via the I/O handle.

Figure 4:
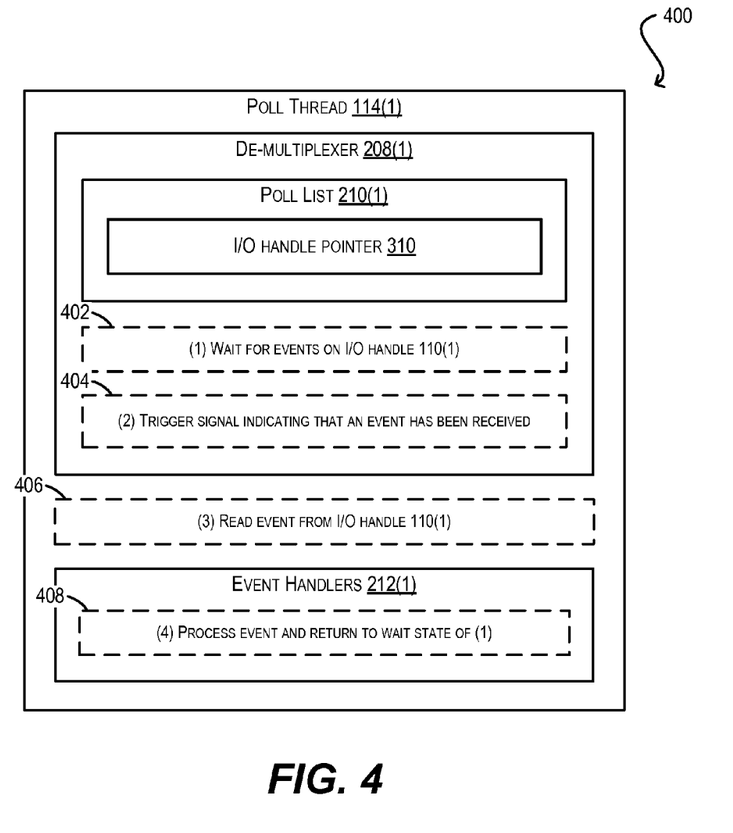
FIG. 4 depicts a first flow for monitoring/processing events according to an embodiment.

FIG. 4 depicts a flow 400 that can be performed by poll thread 114(1) (after flow 300 of FIG. 3) for monitoring and processing events on I/O handle 110(1) according to an embodiment. At step (1) of flow 400 (reference numeral 402), event de-multiplexer 208(1) of poll thread 114(1) can wait for events to be received on I/O handle 110(1) (via I/O handle pointer 310). After some period of time, event de-multiplexer 208(1) can trigger a signal (e.g., a callback) indicating that an event has been received (step (2), reference numeral 404).

In response to the signal, poll thread 114(1) can read the event from I/O handle 110(1) (step (3), reference numeral 406). Poll thread 114(1) can then invoke an appropriate event handler 212(1) for processing the event and thereafter return to step (1) to monitor for additional events.

As noted above with respect to FIG. 3, the event processing that is performed by poll thread 114(1) will generally be independent of the event processing that is concurrently performed by other poll threads 114(2)-114(K) of event-driven application 106. This is because each poll thread is responsible for a distinct, non-overlapping subset of I/O handles that has a relatively high degree of correlation within the subset, but a relatively low (or non-existent) degree of correlation across subsets. As a result, there is little (or no) need for synchronization primitives in the event handling logic of event handler 212(1), thereby simplifying application design and testing. Further, since each poll thread is responsible for both monitoring for and processing events, there is no separate pool of worker threads to delegate the handling of events, which eliminates the need for synchronization among different event handlers within a given poll thread.

Figure 5:
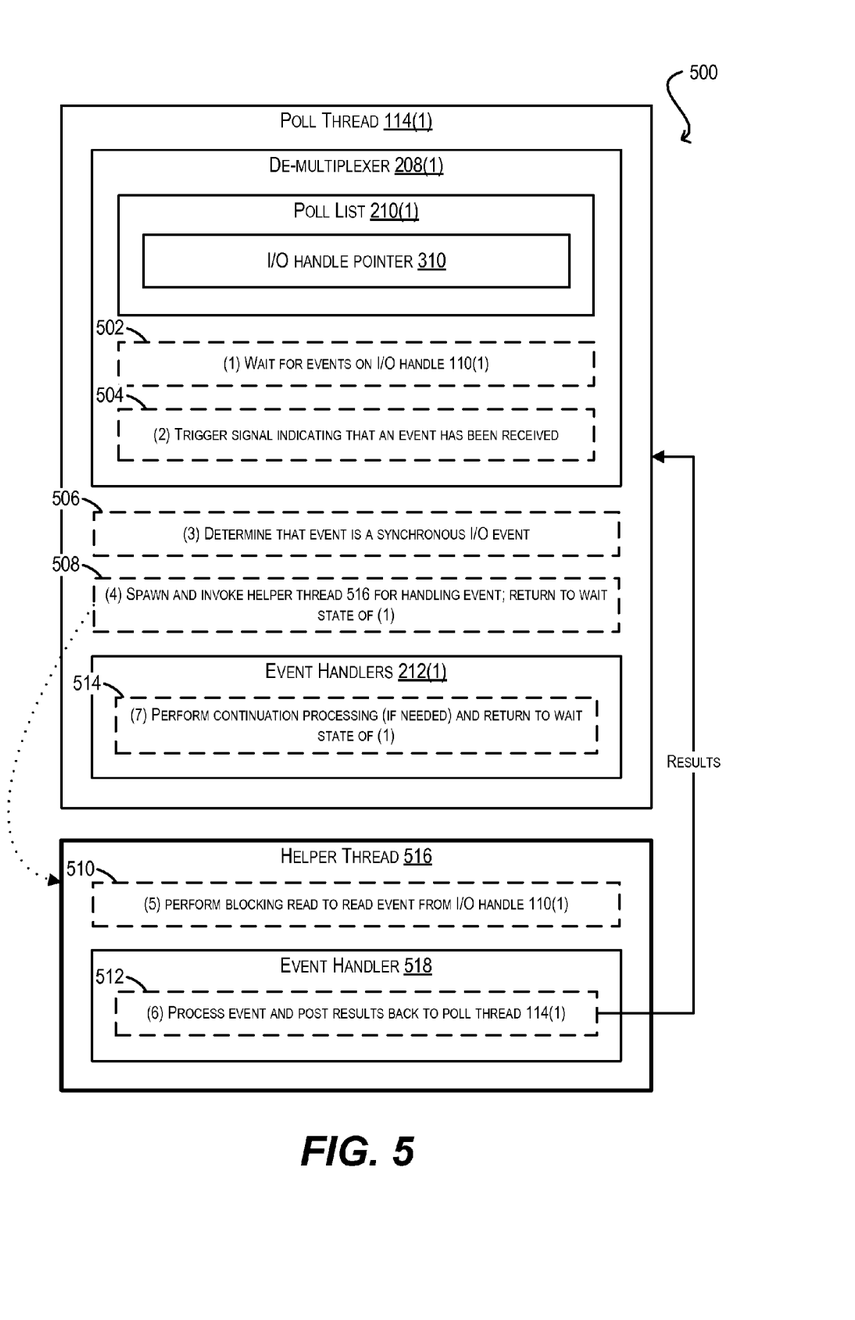
FIG. 5 depicts a second flow for monitoring/processing events according to an embodiment.

In most cases, poll thread 114(1) can perform steps (3) and (4) in flow 400 asynchronously. However, in some situations, poll thread 114(1) may need to handle a synchronous I/O event (e.g., an event that requires a blocking read before it can be processed), which can cause bottlenecking and processor under-utilization. To address this, FIG. 5 depicts a flow 500 that poll thread 114(1) can implement in lieu of flow 400 for processing a synchronous I/O event.

Steps (1) and (2) of flow 500 (reference numerals 502 and 504) are substantially similar to steps (1) and (2) of flow 400 (e.g., event-de-multiplexer 208(1) waits for events on I/O handle 110(1) and triggers a signal when an event is received). At block 506, poll thread 114(1) can detect the signal and determine that the received event is a synchronous I/O event.

Poll thread 114(1) can then spawn and invoke a helper thread 516 for handling the event (rather than handling the event completely within poll thread 114(1)). Since helper thread 516 can operate concurrently with poll thread 114(1), poll thread 114(1) is free to return to step (1) at this point and monitor for/process additional events.

At step (5) (reference numeral 510), helper thread 516 can perform a blocking read in order to read the synchronous I/O event from I/O handle 110(1). Once the read is complete, helper thread 516 can process the event (via event handler 518) and post the results of the processing back to poll thread 114(1) (step (6), reference numeral 512).

At step (7) (reference numeral 514), flow 700 can return to poll thread 114(1), which can receive the results generated by helper thread 516 and perform continuation processing on the results, if needed, using event handler 212(1). Poll thread 114(1) can thereafter return again to the wait state of (1) to monitor for/process additional events.

Figure 6:
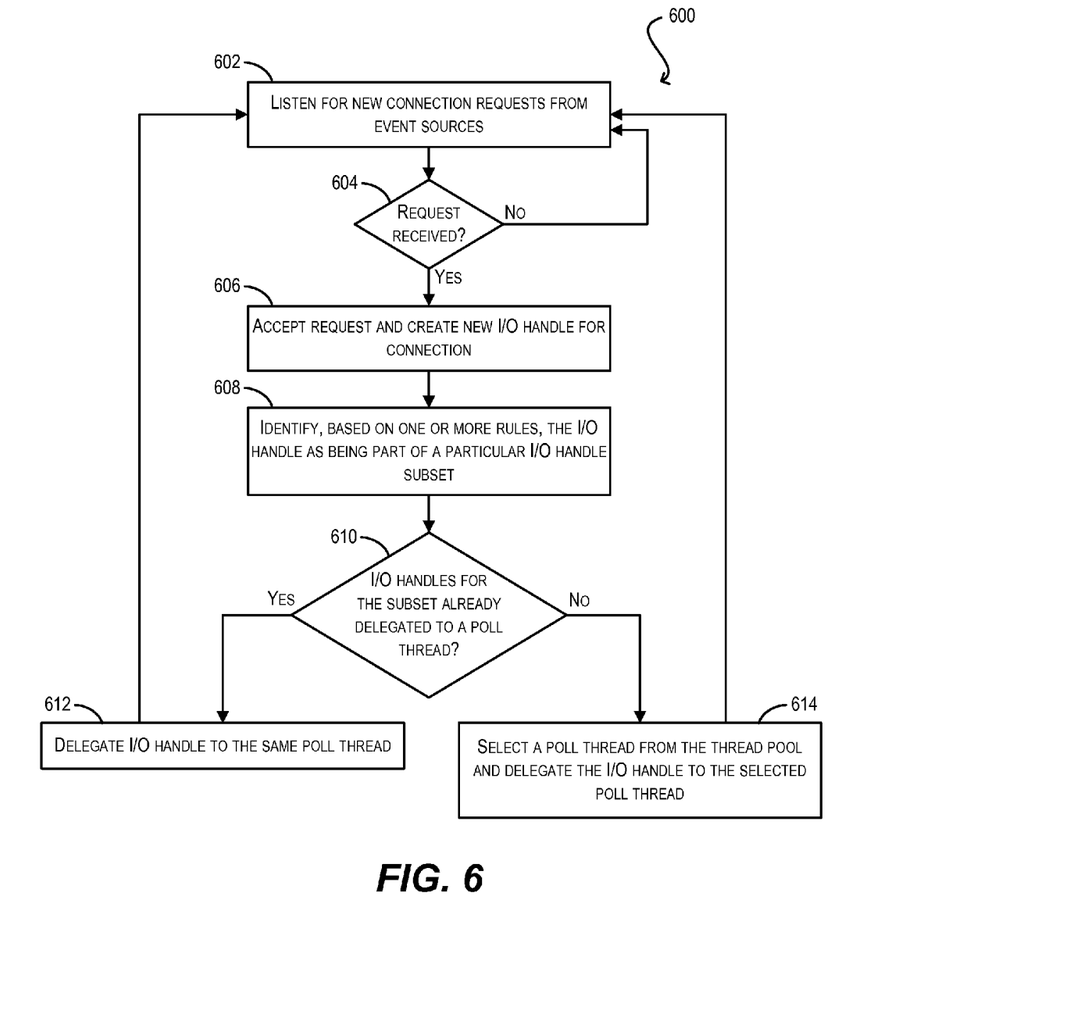
FIG. 6 depicts a flowchart that provides additional details regarding the flow of FIG. 3 according to an embodiment.

FIG. 6 depicts a flowchart 600 that provides additional details regarding the connection request processing that is performed by listener/partitioner 112 in flow 300 of FIG. 3 according to an embodiment. At blocks 602 and 604, listener/partitioner 112 can execute a loop for listening for new connection requests from event sources 108(1)-108(N). If a new connection request is received, listener/partitioner 112 can accept the request and create a new I/O handle (e.g., 110(1)) for the connection (block 606).

At block 608, listener/partitioner 112 can identify, based on one or more preconfigured rules (e.g., subset definitions), newly created I/O handle 110(1) as being part of a particular I/O handle subset. In one embodiment, the subsets can be defined based on an aspect or characteristic of the event sources (e.g., user identity, client device identity, etc.). In another embodiment, the subsets can be defined based on an aspect or characteristic of a backend resource (e.g., a file, database, etc.). In yet other embodiments, the subsets can be based on any other criterion that allows I/O handles to be grouped together based on the degree of correlation (from a synchronization perspective) between their respective events. One of ordinary skill in the art will appreciate many variations, modifications, and alternatives for defining the I/O handle subsets.

Once I/O handle 110(1) has been identified as being part of a particular subset, listener/partitioner 112 can determine whether I/O handles for the subset have already been delegated to a poll thread (block 610). If so, listener/partitioner 112 can delegate I/O handle 110(1) to the same poll thread, thereby ensuring that all I/O handles in the same subset are processed together (i.e., by a single poll thread) (block 612).

On the other hand, if I/O handles for the subset have not already been delegated to a poll thread, listener/partitioner 112 can select a poll thread from the pool of poll threads 114(1)-114(K) and delegate I/O handle 110(1) to the selected poll thread (block 614). Any new I/O handles that are in the same subset as I/O handle 110(1) will thereafter be delegated to the poll thread selected at block 614.

In certain embodiments, listener/partitioner 112 can perform the poll thread selection at block 614 using a basic round-robin scheduling algorithm. For example, listener/partitioner 112 can assign an order to poll threads 114(1)-114(K) and delegate new I/O handles to poll threads according to that order. In other embodiments, listener/partitioner 112 can implement more sophisticated scheduling algorithms. For instance, in a particular embodiment, listener/partitioner 112 can continuously monitor the load of each poll thread 114(1)-114(K) using one or more metrics (e.g., poll list length, processor utilization, etc.). Listener/partitioner 112 can then select a poll thread at block 614 that it determines to have the lightest load. This load balancing approach can more evenly distribute work among poll threads 114(1)-114(K) than the round-robin approach noted above.

After delegating I/O handle 110(1) to a poll thread per block 612 or block 614, listener/partitioner 112 can return to block 602 in order to listen for additional connection requests. This process can repeat until, e.g., event-driven application 106 is terminated.

Figure 7:
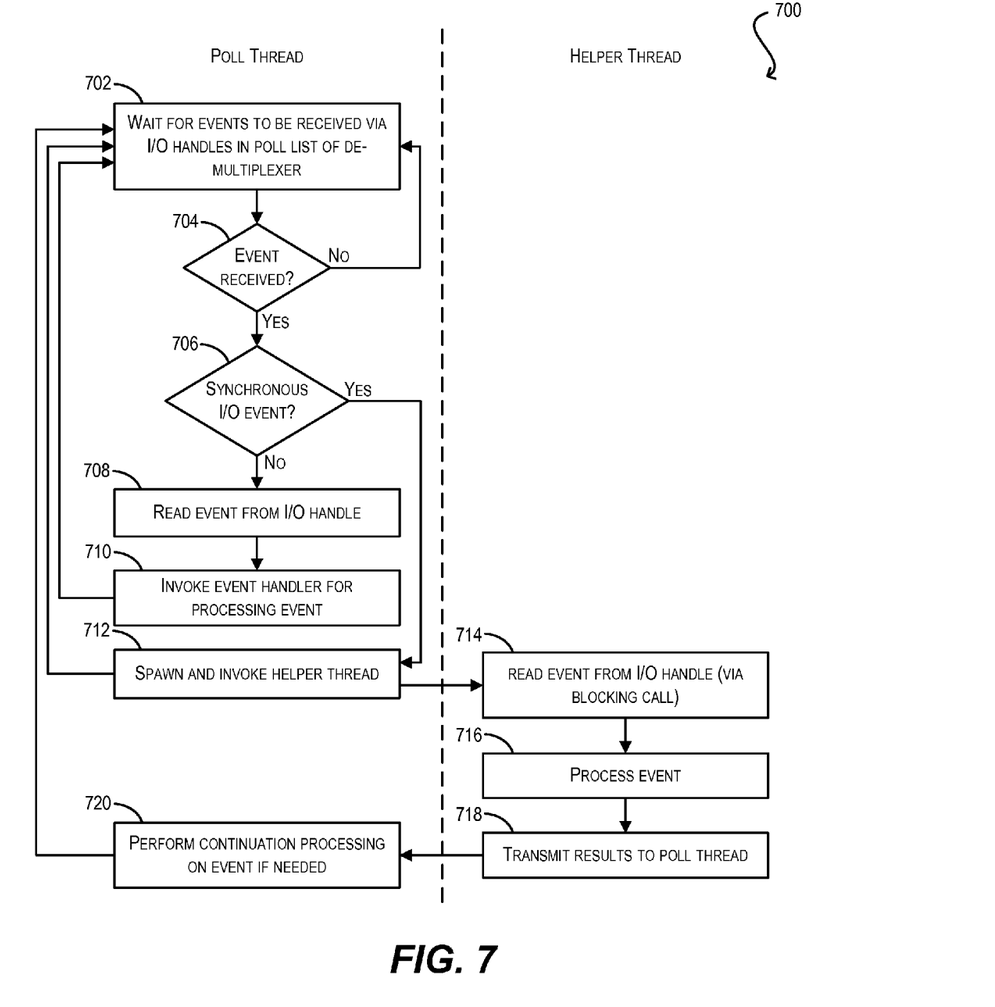
FIG. 7 depicts a flowchart that provides additional details regarding the flows of FIGS. 4 and 5 according to an embodiment.

FIG. 7 depicts a flowchart 700 that provides additional details regarding the event monitoring/processing that is performed by poll thread 114(1) in flows 400 and 500 of FIGS. 4 and 5 according to an embodiment. Flowchart 700 can be performed by poll thread 114(1) after it has been delegated I/O handle 110(1) per block 612 and/or 614 of FIG. 6. At blocks 702 and 704, poll thread 114(1) can enter a loop to monitor for events on the I/O handles in its poll list (e.g., I/O handle 110(1)). If an event is received, poll thread 114(1) can determine whether the event is a synchronous I/O event (block 706). If not, poll thread 114(1) can read the event from its corresponding I/O handle (block 708), invoke an event handler to process the event (710), and return to block 702 to monitor for additional events.

On the other hand, if the received event is a synchronous I/O event, poll thread 114(1) can spawn and invoke a helper thread (e.g., helper thread 516) to handle the event (block 712). Since helper thread 516 can run concurrently with poll thread 114(1), poll thread 114(1) can return to block 702 at this point. Helper thread 516 can read the synchronous I/O event from its corresponding I/O handle using, e.g., a blocking call (block 714) and invoke an event handler to process the event (block 716). Helper thread 516 can then transmit the results of the processing back to poll thread 114(1) (block 718).

At block 720, poll thread 114(1) can receive the results from helper thread 516 and perform continuation processing on the event if needed. Poll thread 114(1) can then return to the monitoring loop of blocks 702 and 704.

Although not shown in FIG. 7, in some situations poll thread 114(1) (and/or helper thread 516) may need to communicate with other poll threads in event-driven application 106 as part of the event processing performed at blocks 710/716. For example, assume that event-driven application 106 is a VM management service and that poll threads 114(1)-114(K) are delegated I/O handle subsets that pertain to individual VMs. In this example, the event handler for one VM (which delegated to, e.g., poll thread 114(1)) may need access to data in a virtual disk owned by another VM (which is delegated, to, e.g., poll thread 114(2)).

To handle these situations without incurring significant synchronization costs, event-driven application 106 can implement an inter-poll thread communication mechanism. This mechanism can enable, e.g., poll thread 114(1) to transmit a message to a second poll thread 114(2)-114(K) in order to request information that is managed by the second poll thread. The second poll thread can then send a reply message to poll thread 114(1) with the requested information. In certain embodiments, this messaging mechanism can include a query service that poll threads 114(1)-114(K) can invoke to help identify a correct messaging target based on one or more query criteria.

Figure 8:
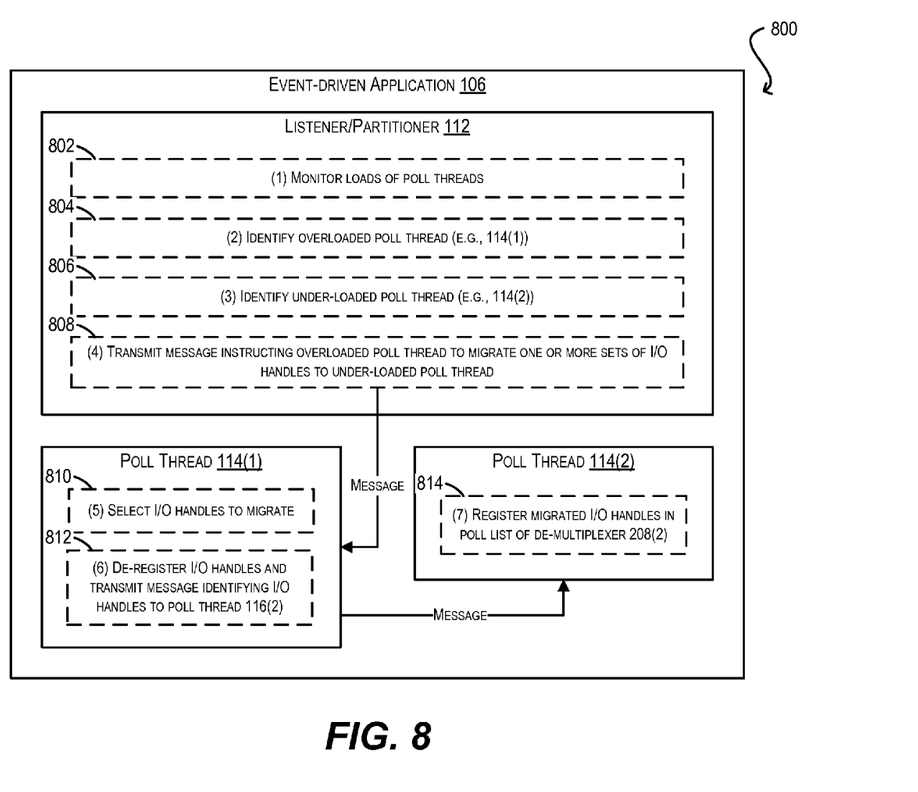
FIG. 8 depicts a flow for performing load balancing across poll threads according to an embodiment.

As described above with respect to FIG. 6, listener/partitioner 112 can, in some cases, implement a load balancing approach at the time of delegating new I/O handles to poll threads in order to more evenly distribute work. However, certain I/O handles that have already been delegated to a poll thread may receive a large volume of events that overload the poll thread over time, thereby disrupting the work distribution that was determined at the time of delegation. To address this, FIG. 8 depicts a flow 800 for dynamically re-allocating I/O handles among poll threads according to an embodiment.

At block 802, listener/partitioner 112 can continuously monitor the loads of poll threads 114(1)-114(K) during the operation of event-driven application 106. For example, listener/partitioner 112 can monitor each poll thread's poll list length, processor utilization, or the like.

At blocks 804 and 806, listener/partitioner 112 can determine that one poll thread (e.g., 114(1)) is overloaded, while another poll thread (e.g., 114(2)) is under-loaded. As a result, listener/partitioner 112 can transmit a message to overloaded poll thread 114(1) with instructions to migrate one or more subsets of I/O handles to under-loaded poll thread 114(2) (block 808).

At block 810, overloaded poll thread 114(1) can receive the message and select one or more I/O handles for migration. Generally speaking, overloaded poll thread 114(1) will select entire I/O handle subsets at this step, since this will ensure that there is no need for synchronization between poll thread 114(1) and the migration target (poll thread 114(2)).

At block 812, overloaded poll thread 114(1) can de-register the selected I/O handles from its event de-multiplexer 208(1) and transmit a message to under-loaded poll thread 114(2) identifying the I/O handles. In response, under-loaded poll thread 114(2) can register the I/O handles with its own event de-multiplexer 208(2) and thereby take over responsibility for those handles (block 814).

Figure 9:
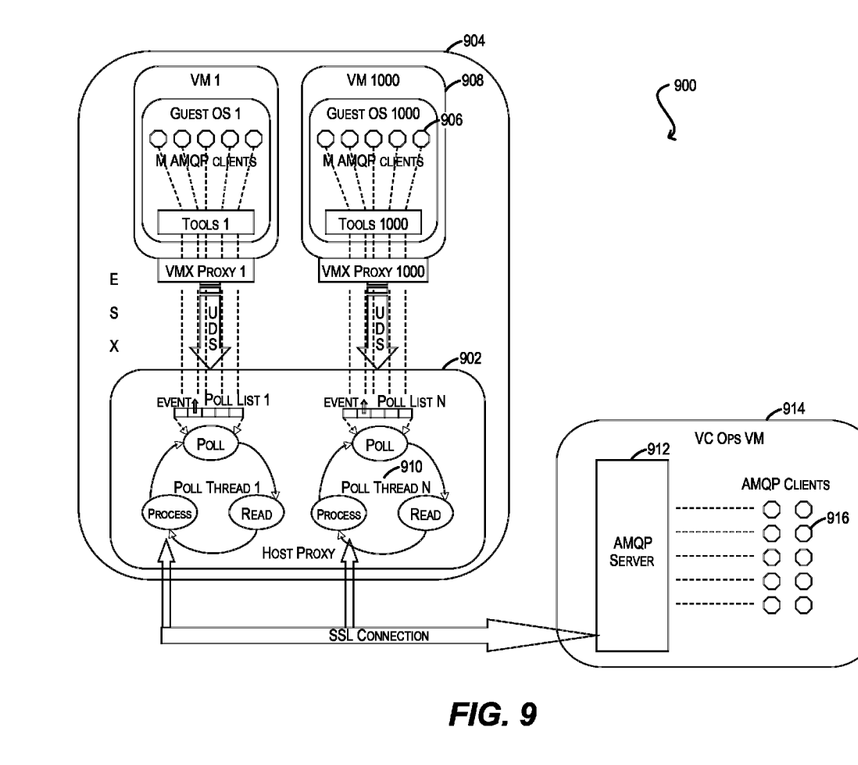
FIG. 9 depicts an exemplary event handling system according to an embodiment.

FIG. 9 depicts an exemplary event handling system 900 that implements a number of the concepts described above. In the embodiment of FIG. 9, the event-driven application is a host proxy service 902 that resides within a hypervisor (ESX 904). Host proxy service 902 receives connection requests from event sources (AMQP clients 906) executing within VMs 908. As shown, there are M AMQP clients per VM and 1000 VMs total, resulting in M×1000 event sources. Host proxy service 902 then creates I/O handles for the connections and partitions the I/O handles across N poll threads 910 according to the techniques described with respect to FIGS. 2-8 above. Each poll thread is configured to monitor for and process events receive via its delegated I/O handles. As part of this event processing, each poll thread establishes an SSL connection to a messaging server (AMQP server 912) running in a management VM (VP Ops VM 914) and transmits data over the connection. The data can then be consumed by one or more AMQP clients 916 in the management VM.

Note that, in the embodiment of FIG. 9, there is no separate listener/partitioner component within host proxy service 902. This is because the functionality of the listener/partitioner is assigned to one of the poll threads 910. In alternative embodiments, the listener/partitioner can be assigned its own dedicated thread.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Disc)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for handling events, the method comprising:
creating, by a computer system, a plurality of I/O handles for receiving events;
partitioning, by the computer system, the plurality of I/O handles into one or more subsets, wherein the partitioning causes correlated I/O handles in the plurality of I/O handles to be placed in the same subset, the correlated I/O handles being configured to receive events that, if handled concurrently by different poll threads in a plurality of poll threads, would require event handling synchronization across at least a portion of the different poll threads; and
delegating, by the computer system, each I/O handle in the plurality of I/O handles to a poll thread in the plurality of poll threads, wherein I/O handles in the same subset are delegated to the same poll thread.

2. The method of claim 1 wherein the number of poll threads is related to a number of available processors in the computer system.

3. The method of claim 1 wherein the delegating comprises:
causing the I/O handle to be registered with an event de-multiplexer running within the poll thread.

4. The method of claim 3 further comprising, by the poll thread:
detecting, using the event de-mutliplexer, an event received via the I/O handle;
if the event is an asynchronous I/O event, reading and processing the event; and
if the event is a synchronous I/O event, spawning a helper thread to read and process the event.

5. The method of claim 4 wherein processing the event comprises:
determining that the processing requires information accessible by another poll thread; and
transmitting a message directly to said another poll thread for requesting the information.

6. The method of claim 1 wherein the plurality of I/O handles are partitioned into the one or more subsets based on an event source of each I/O handle or a resource accessed by the events received via each I/O handle.

7. The method of claim 1 further comprising:
monitoring one or more load metrics for each of the plurality of poll threads;
identifying an overloaded poll thread;
identifying an under-loaded poll thread; and
instructing the overloaded poll thread to migrate one or more subsets of I/O handles to the under-loaded poll thread.

8. The method of claim 1 wherein the partitioning further causes uncorrelated I/O handles in the plurality of I/O handles to be placed in different subsets, the uncorrelated I/O handles being configured to receive events that, if handled concurrently by different poll threads in a plurality of poll threads, would not require event handling synchronization across the different poll threads.

9. The method of claim 1 wherein the correlated I/O handles are configured to receive write requests that are directed to a common data resource.

10. The method of claim 1 wherein the event handling synchronization comprises implementation of a synchronization primitive in event handling logic of each of the different poll threads to avoid resource deadlocks or race conditions.

11. A non-transitory computer readable storage medium having stored thereon software executable by a computer system, the software embodying a method for handling events comprising:
creating a plurality of I/O handles for receiving events;
partitioning the plurality of I/O handles into one or more subsets, wherein the partitioning causes correlated I/O handles in the plurality of I/O handles to be placed in the same subset, the correlated I/O handles being configured to receive events that, if handled concurrently by different poll threads in a plurality of poll threads, would require event handling synchronization across at least a portion of the different poll threads; and
delegating each I/O handle in the plurality of I/O handles to a poll thread in the plurality of poll threads, wherein I/O handles in the same subset are delegated to the same poll thread.

12. The non-transitory computer readable storage medium of claim 11 wherein the number of poll threads is related to a number of available processors in the computer system.

13. The non-transitory computer readable storage medium of claim 11 wherein the delegating comprises:
causing the I/O handle to be registered with an event de-multiplexer running within the poll thread.

14. The non-transitory computer readable storage medium of claim 13 wherein the method further comprises, by the poll thread:
detecting, using the event de-mutliplexer, an event received via the I/O handle;
if the event is an asynchronous I/O event, processing the event; and
if the event is a synchronous I/O event, spawning a helper thread to process the event.

15. The non-transitory computer readable storage medium of claim 14 wherein processing the event comprises:
determining that the processing requires information accessible by another poll thread; and
transmitting a message directly to said another poll thread for requesting the information.

16. The non-transitory computer readable storage medium of claim 8 wherein the plurality of I/O handles are partitioned into the one or more subsets based on an event source of each I/O handle or a resource accessed by the events received via each I/O handle.

17. The non-transitory computer readable storage medium of claim 8 wherein the method further comprises:
monitoring one or more load metrics for each of the plurality of poll threads;
identifying an overloaded poll thread;
identifying an under-loaded poll thread; and
instructing the overloaded poll thread to migrate one or more subsets of I/O handles to the under-loaded poll thread.

18. The non-transitory computer readable storage medium of claim 11 wherein the partitioning further causes uncorrelated I/O handles in the plurality of I/O handles to be placed in different subsets, the uncorrelated I/O handles being configured to receive events that, if handled concurrently by different poll threads in a plurality of poll threads, would not require event handling synchronization across the different poll threads.

19. The non-transitory computer readable storage medium of claim 11 wherein the correlated I/O handles are configured to receive write requests that are directed to a common data resource.

20. The non-transitory computer readable storage medium of claim 11 wherein the event handling synchronization comprises implementation of a synchronization primitive in event handling logic of each of the different poll threads to avoid resource deadlocks or race conditions.

21. A computer system comprising:
   a plurality of processors; and
   a non-transitory data store having stored thereon program code which, when executed by one or more of the plurality of processors, causes the one or more processors to:
      create a plurality of I/O handles for receiving events;
      partition the plurality of I/O handles into one or more subsets, wherein the partitioning causes correlated I/O handles in the plurality of I/O handles to be placed in the same subset, the correlated I/O handles being configured to receive events that, if handled concurrently by different poll threads in a plurality of poll threads, would require event handling synchronization across at least a portion of the different poll threads; and
      delegate each I/O handle in the plurality of I/O handles to a poll thread in a plurality of poll threads, wherein I/O handles in the same subset are delegated to the same poll thread.

22. The system of claim 21 wherein the number of poll threads is related to a number of available processors in the plurality of processors.

23. The system of claim 21 wherein the delegating comprises:
   causing the I/O handle to be registered with an event de-multiplexer running within the poll thread.

24. The system of claim 23 wherein the program code further causes a processor executing the poll thread to:
   detect, using the event de-mutliplexer, an event received via the I/O handle;
   if the event is an asynchronous I/O event, process the event; and
   if the event is a synchronous I/O event, spawn a helper thread to process the event.

25. The system of claim 24 wherein processing the event comprises:
   determining that the processing requires information accessible by another poll thread; and
   transmitting a message directly to said another poll thread for requesting the information.

26. The system of claim 21 wherein the plurality of I/O handles are partitioned into the one or more subsets based on an event source of each I/O handle or a resource accessed by the events received via each I/O handle.

27. The system of claim 21 wherein the program code further causes the one or more processors to:
   monitor one or more load metrics for each of the plurality of poll threads;
   identify an overloaded poll thread;
   identify an under-loaded poll thread; and
   instruct the overloaded poll thread to migrate one or more subsets of I/O handles to the under-loaded poll thread.

28. The computer system of claim 21 wherein the partitioning further causes uncorrelated I/O handles in the plurality of I/O handles to be placed in different subsets, the uncorrelated I/O handles being configured to receive events that, if handled concurrently by different poll threads in a plurality of poll threads, would not require event handling synchronization across the different poll threads.

29. The computer system of claim 21 wherein the correlated I/O handles are configured to receive write requests that are directed to a common data resource.

30. The computer system of claim 21 wherein the event handling synchronization comprises implementation of a synchronization primitive in event handling logic of each of the different poll threads to avoid resource deadlocks or race conditions.

* * * * *